(12) United States Patent
Pazik et al.

(10) Patent No.: US 8,356,444 B2
(45) Date of Patent: Jan. 22, 2013

(54) TRAP AND METHOD FOR TRAPPING FLYING INSECTS

(76) Inventors: Karol Pazik, Luton (GB); Edward Pazik, Dunstable (GB)

( * ) Notice: Subject to any disclaimer, the term of this patent is extended or adjusted under 35 U.S.C. 154(b) by 1409 days.

(21) Appl. No.: 10/480,161

(22) PCT Filed: Jun. 13, 2002

(86) PCT No.: PCT/GB02/02759
§ 371 (c)(1),
(2), (4) Date: Jun. 7, 2004

(87) PCT Pub. No.: WO02/102145
PCT Pub. Date: Dec. 27, 2002

(65) Prior Publication Data
US 2004/0231228 A1    Nov. 25, 2004

(30) Foreign Application Priority Data

Jun. 14, 2001   (GB) .................................. 0114492.2
Mar. 8, 2002    (GB) .................................. 0205511.9

(51) Int. Cl.
*A01M 1/20*    (2006.01)
(52) U.S. Cl. ................. 43/107; 43/122; 43/133
(58) Field of Classification Search ............ 43/107, 43/122, 121, 131, 132.1, 133
See application file for complete search history.

(56) References Cited

U.S. PATENT DOCUMENTS

| 1,544,334 | A | * | 6/1925 | Martin | 43/119 |
| 1,783,631 | A | * | 12/1930 | Sladky | 43/107 |
| 2,741,066 | A | * | 4/1956 | Conway | 43/121 |
| 2,796,696 | A | * | 6/1957 | Kea | 43/121 |
| 4,121,372 | A |   | 10/1978 | Landaus | |
| 4,360,987 | A |   | 11/1982 | Lowder | |
| 4,501,088 | A |   | 2/1985 | Boisvert et al. | |
| 4,551,941 | A |   | 11/1985 | Schneidmiller | |
| 4,577,434 | A | * | 3/1986 | Davis | 43/115 |
| 4,718,193 | A |   | 1/1988 | Rosselli | |
| 4,794,724 | A |   | 1/1989 | Peters | |
| 4,802,303 | A | * | 2/1989 | Floyd III | 43/131 |
| 4,977,701 | A |   | 12/1990 | Sherman | |
| 4,979,330 | A | * | 12/1990 | Rorant | 43/139 |
| 5,274,949 | A | * | 1/1994 | Beaton | 43/113 |
| 5,452,540 | A | * | 9/1995 | Dowd et al. | 43/107 |
| 5,522,171 | A | * | 6/1996 | Mandeville | 43/122 |
| 5,685,109 | A |   | 11/1997 | Rimback | |
| 5,749,168 | A |   | 5/1998 | Chrysanthis | |
| 6,014,834 | A | * | 1/2000 | Ferland | 43/131 |
| 6,112,452 | A | * | 9/2000 | Campbell | 43/107 |

FOREIGN PATENT DOCUMENTS

| CH | 116301 | 8/1926 |
| DE | 29 40 240 | 5/1980 |
| DE | 195 31 981 | 3/1997 |
| EP | 0 097 591 | 1/1984 |

(Continued)

*Primary Examiner* — Christopher P Ellis

(57) ABSTRACT

A trap for insects, particularly for wasps, comprises a vapour chamber having at least one insect entrance defined in a wall of the vapour chamber, and a bait or collection chamber couplable to the vapour chamber at a restriction. The restriction is sized to control the movement of insects between these two chambers. In operation, attractant vapour from a bait source accumulates in the vapour chamber and is released through the entrance. Insects attracted by the attractant vapour enter the vapour chamber and are maintained in flight within it, the restriction delaying their entry into the collection chamber. Once tired, insects drop down into the collection chamber where, in a preferred embodiment, they are immersed in a fluid and drowned.

17 Claims, 15 Drawing Sheets

FOREIGN PATENT DOCUMENTS

| | | |
|---|---|---|
| GB | 1 046 518 | 10/1966 |
| GB | 2 025 888 | 1/1980 |
| GB | 2 328 135 | 2/1999 |
| WO | WO 83/01912 | 6/1983 |

* cited by examiner

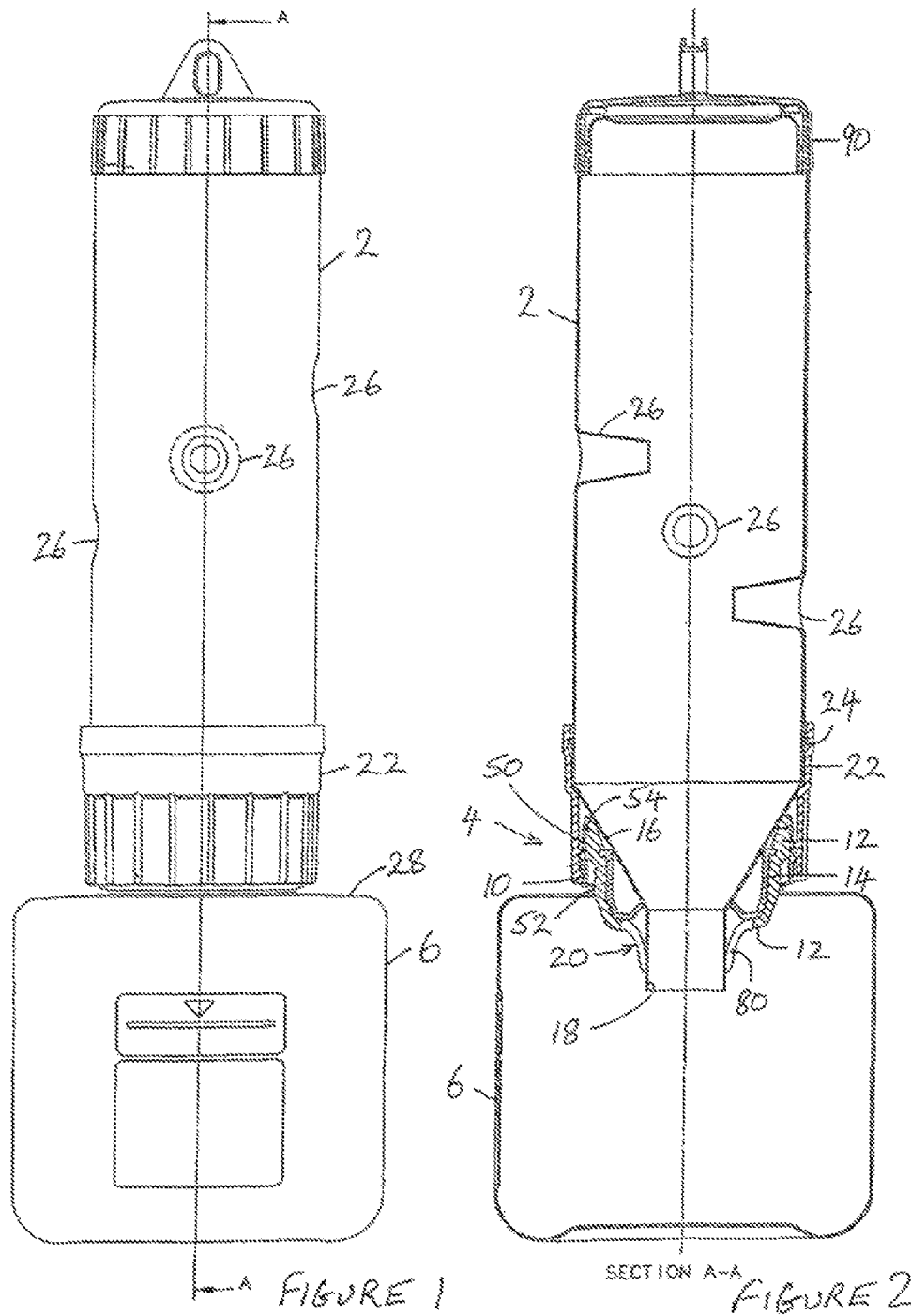

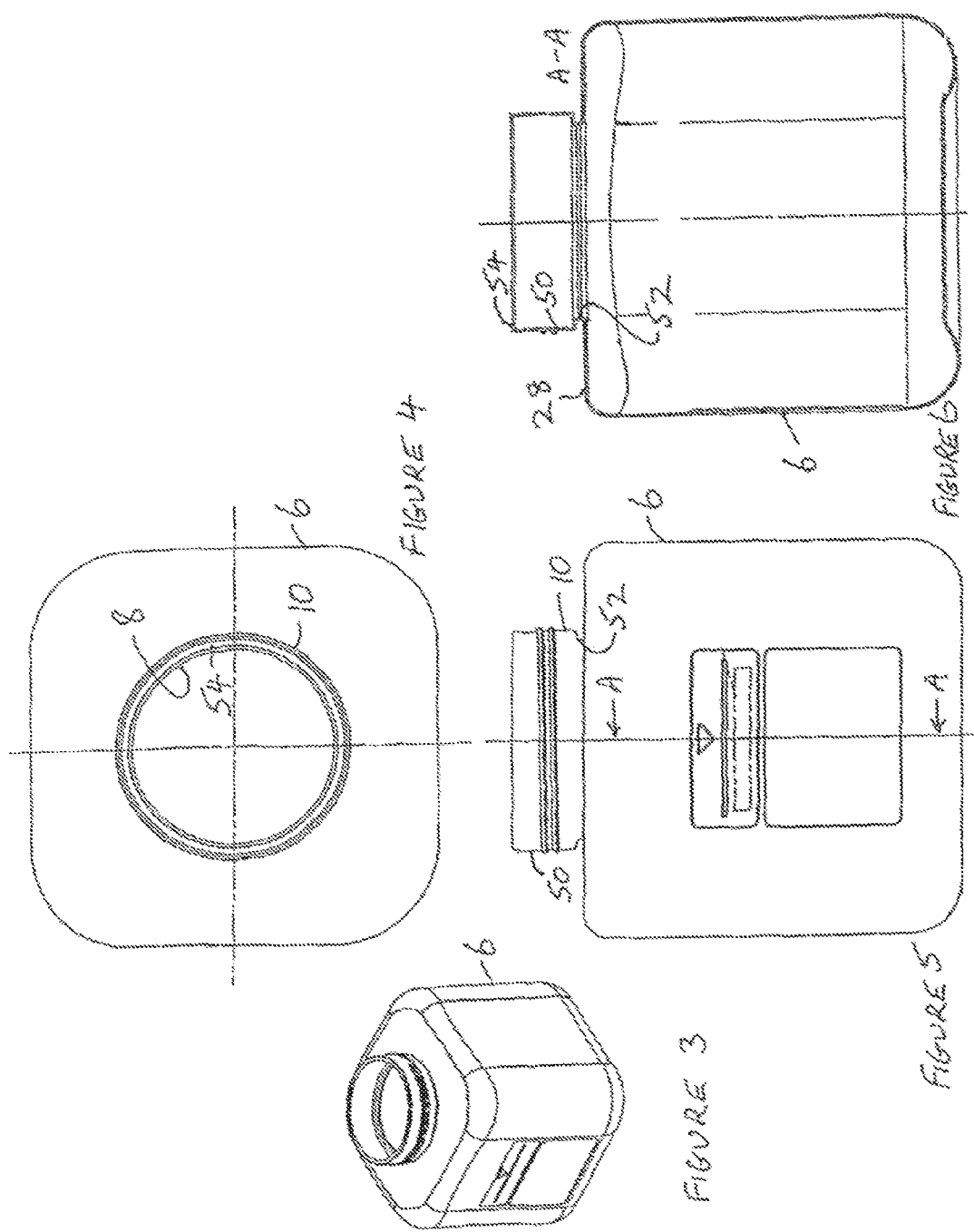

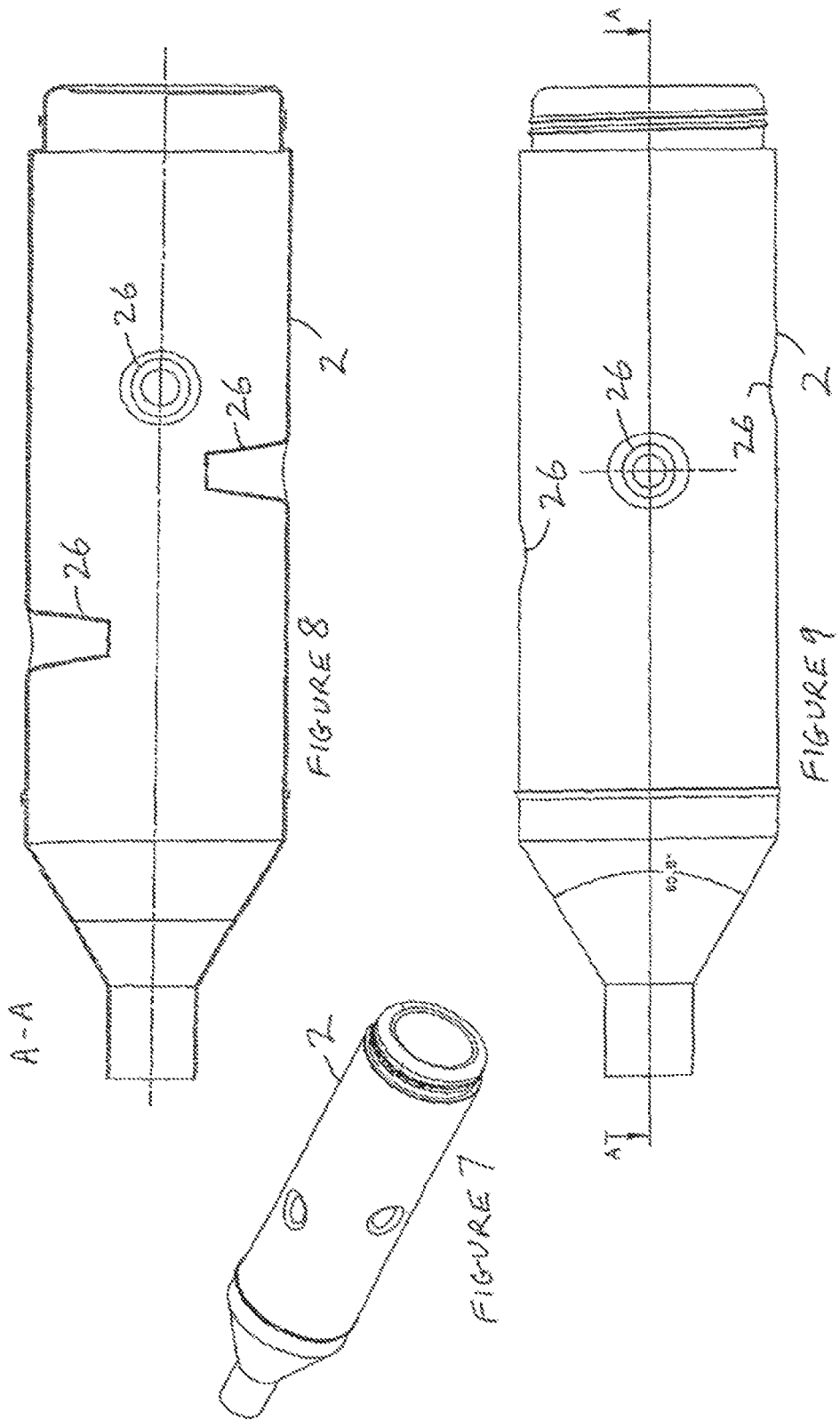

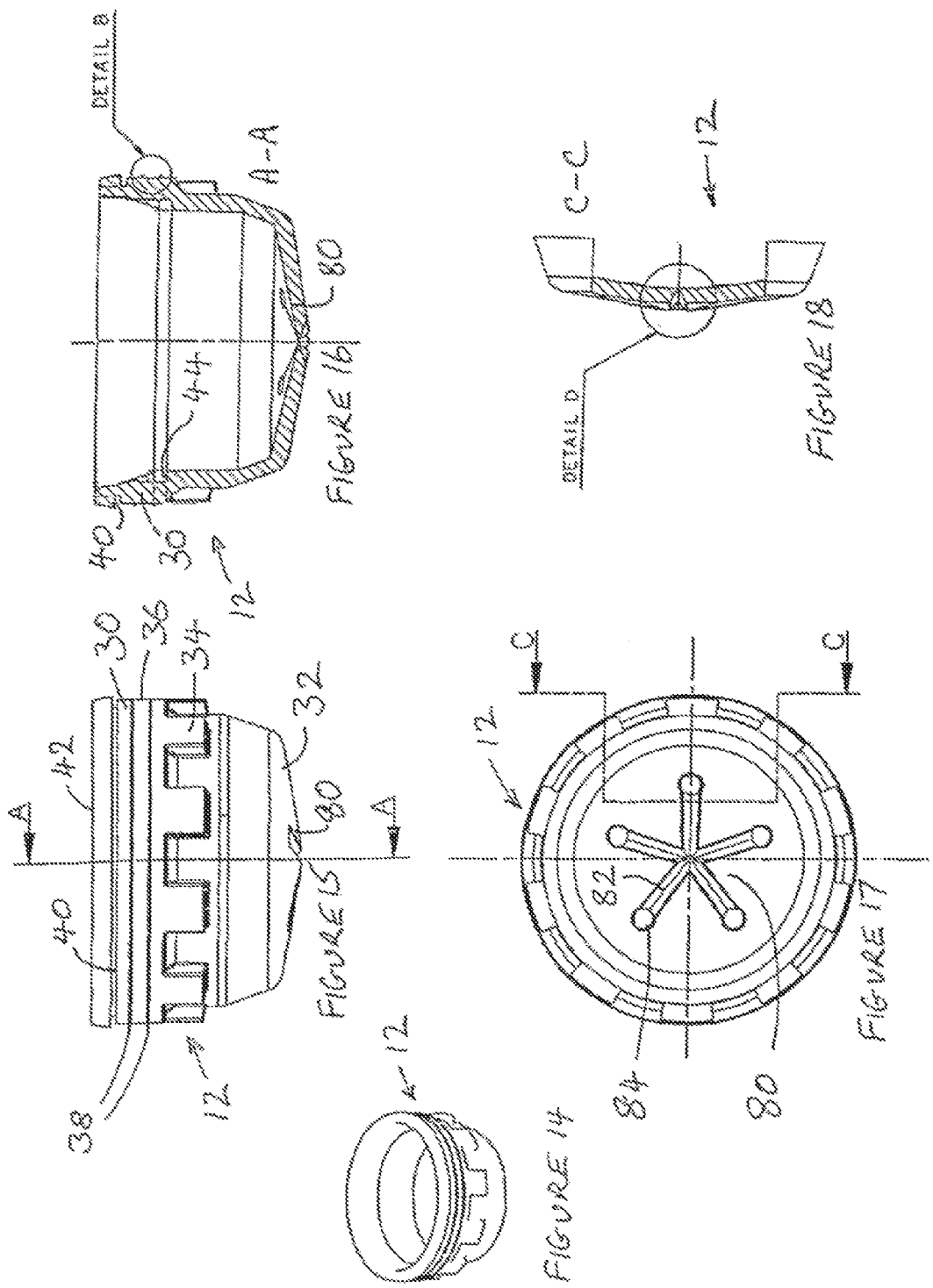

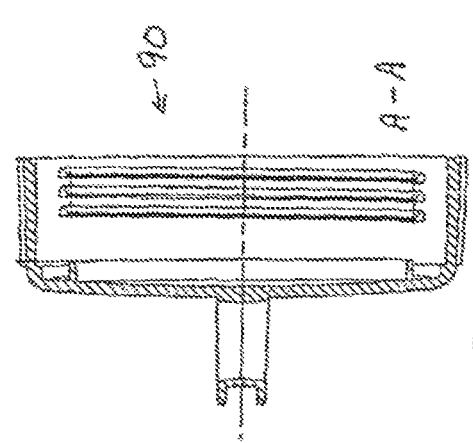
FIGURE 27
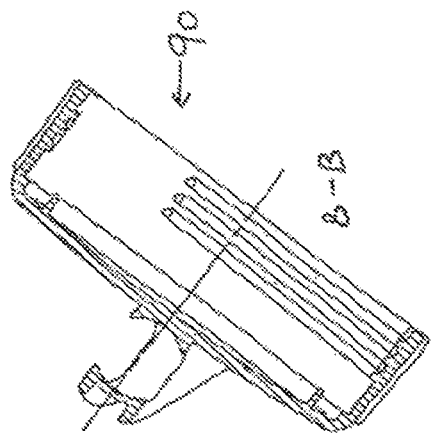
FIGURE 29
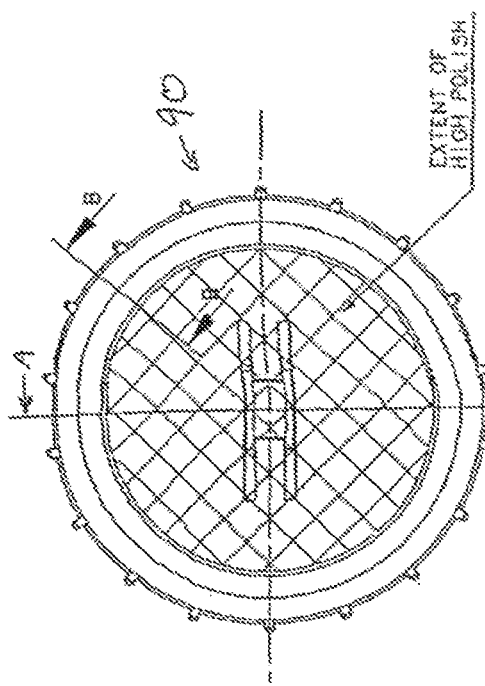
FIGURE 26
FIGURE 28
FIGURE 25

TRAP AND METHOD FOR TRAPPING FLYING INSECTS

The invention relates to a trap and a method for trapping flying insects, in particular for trapping wasps, yellowjackets or the like.

Flying insects, including stinging insects such as wasps, are well known to be a nuisance in particular environments. For example, in soft fruit orchards wasps can cause considerable damage to fruit, rendering it unsaleable. It is clearly desirable in such environments to be able to reduce insect numbers. A variety of methods have been used to try to do this, including the use of pesticides and traps. In order to avoid environmental damage, particularly near human food crops such as fruit, it is desirable to avoid the use of pesticides. A number of trap designs exist but in tests the present inventor has found conventional designs to be unsatisfactory, primarily because they trap insufficient numbers of insects but also in terms of ease and safety of use.

The invention provides a trap and a method for trapping flying insects as defined in the appended independent claims. Preferred or advantageous features of the invention are set out in dependent sub-claims.

In its first aspect, the invention thus provides a trap comprising a vapour chamber, one or more entrances for insects defined in a wall of the vapour chamber, and a collection chamber coupled or couplable to the vapour chamber at a restriction. The collection chamber has no insect entrances, except at the restriction, which controls the movement of insects from the vapour chamber to the collection chamber.

In this and other aspects of the invention, the trap advantageously comprises a number of important design features to enhance its effectiveness and ease and safety of use. These design features are described below with particular reference to preferred embodiments of the invention for trapping wasps 1. Valour Chamber
   1.1 The vapour chamber is preferably a distinct chamber from the collection chamber. The vapour chamber may advantageously be manufactured from a clear plastics material, such as PET (polyethylene terephthalate). There are three principal functions of this chamber:
   1.2 The vapour chamber is advantageously designed to maximise the lure of an attractant (bait), which may be provided in the collection chamber. In natural light, the vapour chamber behaves as a greenhouse raising internal temperatures within the chamber. This has the effect of pumping out attractant vapour through the process of gaseous expansion assisted by convection. Convection within the vapour chamber is also promoted in a preferred embodiment by having a controlled number of entrance flutes (funnels) which are positioned at angles to each other. It is particularly preferred to have four entrance flutes. Increasing the number of flutes tends to increase the chance of wasp escape and reduces the greenhouse effect within the chamber. Reducing the number of flutes tends to reduce the effect of drafts through the chamber dispersing attractant aroma or vapour.
   1.3 The vapour chamber is preferably designed to capture and retain wasps. The clear PET plastic encourages the wasps in the chamber to continue to fly against the wall of the chamber in a bid to escape rather than being guided to the entrance points. (In other words, were the chamber to be constructed of opaque or dark or coloured materials, light entering the chamber through the entrance flutes would illuminate an escape route for the wasps.)
   1.4 The preferred design of the vapour chamber and the trap may advantageously prevent or delay the entry of wasps into the collection chamber, and their immersion in attractant fluid if present in the collection chamber, preferably for as long as possible. The reason for this is that the vapour chamber of the trap provides an environment for wasps from different nests to interact aggressively, and the restriction between the vapour and collection chambers prevents the wasps from leaving the vapour chamber too easily. Wasps from different nests become distressed when in close proximity and release chemical messengers to both warn and call more wasps for assistance. This sociological defence mechanism of the wasps is exploited by the vapour chamber as it promotes prolonged close proximity of the wasps and prolongs the period during which the wasps continue to emit the chemical messengers. Once the wasps are immersed in the attractant or bait (if present in the collection chamber), which is usually a liquid, then the release of these distress chemical messengers to the atmosphere is inhibited. The vapour chamber therefore advantageously has a tall cylindrical shape, which together with the restriction at the vapour chamber exit acts to retain wasps in this chamber for as long as possible. Furthermore, because the vapour chamber is saturated with attractant vapour, the wasps trapped inside tend to be unable to distinguish where the attractant vapour is coming from, and so are not led to the collection chamber by following an increasing vapour concentration. This is also an important design feature in retaining the wasps for as long as possible within the vapour chamber.
   1.5 The shape and size of the vapour chamber in the preferred wasp trap have been determined through a significant amount of experimentation. It is important to the efficiency of the wasp trap to have a tall vapour chamber of relatively narrow diameter. The reason for this is to give wasps trapped in the vapour chamber sufficient freedom of movement to allow for aerial manoeuvres in either attacking or escaping from other wasps also captured within the chamber whilst at the same time confining those movements so that the wasps within the trap are maintained in close enough proximity to propagate the distress response. A tall vapour chamber allows for considerable vertical freedom of flight and this is consistent with the flight behaviour of wasps for two reasons: firstly, wasps will drop vertically in a natural defensive manoeuvre to avoid predators or other wasps, and secondly, wasps then fly vertically to escape. A tall vapour chamber therefore advantageously reflects and accommodates this behaviour. Importantly, the tall design tends to increase the time that a wasp flies in s the vapour chamber before falling into the collection chamber and any attractant liquid therein. And also means that the wasps when having vertically congregate in the same vicinity.
   1.6 The vapour chamber is preferably designed such that the entrance flutes are sited at a predetermined distance from the top of the chamber. For example, each entrance is spaced from the top of the vapour chamber by at least a third of the height of the vapour chamber. This is important because for the trap to work most efficiently the wasps should have a "flying zone" within the chamber in which to compete and interact with other wasps. The inventor has found that siting the entrance flutes too high up in the chamber results in more wasps escaping. This is believed to be because wasps have a tendency to fly vertically, so that they tend to congregate at the highest part of the chamber.
   1.7 The width of the vapour chamber may also be affected by the shape of the restriction leading to the collection chamber. For example, in a preferred restriction is a downward-sloping frusto-conical funnel, which is preferably sufficiently steep to prevent wasps from having a perch upon which they can rest.

2. Entrance Flutes 2.1 The entrance flutes (funnels) are preferably horizontal in orientation or should have only a shallow slope. The reason for this is to facilitate ease of access for the wasps. In particular on a smooth surface, such as a PET surface, wasps are unable to easily negotiate vertically-orientated or steeply-sloping flutes.

2.2 The flutes are preferably tapered from a wider entrance to a narrower exit into the vapour chamber. The reason for this is to provide an easy landing platform for the wasps, and easy access into the vapour chamber, whilst the narrower exit means that the wasps find it more difficult to escape from the vapour chamber.

2.3 The size of the flutes in the preferred embodiment for trapping wasps is carefully controlled to allow access for both British and European varieties of wasp (both foragers and queens) whilst minimising the size of the escape route.

2.4 The flutes are preferably of a carefully predetermined length to reduce the chance of trapped wasps finding the exit. This length has been determined through experiment and by observing the flight behaviour of trapped wasps. Wasps flying against the walls of the trap periodically rebound from the walls but do so without rebounding by more than a given distance. The flutes are carefully controlled to this length. Longer flutes prevent rebounding wasps from escaping but disadvantageously reduce the space for flying inside the vapour chamber.

2.5 The flutes are preferably of a number and positioned around the chamber so as to maximise drafts through the chamber to enhance the attractant lure of the trap whilst minimising the incidence of wasp escape and whilst protecting as far as possible the greenhouse conditions within the vapour chamber.

2.6. The flutes are preferably staggered in vertical orientation (vertically spaced) to prevent wasps flying straight through the trap, and to increase the amount of convection within the trap so as to enhance the vaporisation of the attractant by continuously removing more vapour from the trap, so reducing the vapour density of the attractant in the head space of the trap (i.e. the vappur chamber), so promoting further evaporation of attractant.

3. Restriction Between Vapour Chamber and Collection Chamber 3.1 The restriction is preferably designed so as to allow wasps that are tired to pass or drop through into the collection chamber but to deter or delay the passage of more energetic wasps into the collection chamber. Advantageously, the restriction takes the form of a downward-sloping, frusto-conical funnel at the base of the vapour chamber, the collection chamber being positioned below the funnel opening.

3.2 Wasps have a natural tendency to fly towards light. The restriction is preferably manufactured in an opaque material, such as black opaque PET, to guide wasps (which tend to fly towards light) towards the clear transparent walls of the wasp trap. Advantageously, both the vapour chamber and the collection chamber have transparent walls. This effectively helps delay the passage of wasps into the collection chamber and also helps to retain wasps in the collection chamber by encouraging them to fly consistently away from the exit (the restriction) towards the clear walls of the collection chamber.

3.3 The restriction is preferably designed to fit sealingly into an aperture in a safety plug or closure which fits in an opening at the top of the collection chamber where the collection chamber couples to the vapour chamber. When the vapour chamber is assembled onto the collection chamber the restriction preferably prises or urges open a self-closing mechanism, such as a sprung flap. While the vapour chamber is disassembled from the collection chamber, the restriction continues to prevent the escape of wasps from the collection chamber because a seal between the two is maintained until such time as the flap or other self-closing mechanism closes. This is a safety feature of the trap designed to protect the operator from accidental wasp stings.

3.4 When the restriction is implemented as a funnel, the slope of the funnel is preferably more than 50°, and particularly preferably at least 60°, from the horizontal. This preferably prevents tired wasps from gaining purchase and prevents them from, resting, and facilitates the eventual passage of wasps into the killing chamber once they have become too tired to continue flying in the vapour chamber. The minimum slope of the funnel may depend on the smoothness of the material from which it is made. A PET funnel preferably has a slope of at least 60°.

3.5 When the restriction is embodied as a funnel, the size of the funnel opening has been assessed through experimentation and it has been found that it is preferably linked to the width of the vapour chamber and slope of the funnel. All of these parameters work together to provide optimum conditions for the efficacy of the wasp trap. If the funnel opening is too large, free falling wasps in defence flight are more prone to fall directly into the attractant liquid. The funnel helps to prevent this in those wasps that are not too tired. Furthermore, if the funnel opening is too large, then a larger and more robust self-closing mechanism may be required. For example, if a self-closing flap is used then if the funnel opening is large, the flap may need to be disadvantageously big and, more importantly, the required depth of the killing chamber may become impractically large in order to prevent snagging of the self-closing flap on captured and dead wasps once the chamber starts to fill.

4. Collection Chamber Safety Plug or Closure Apparatus 4.1 The collection chamber safety plug is a safety feature of preferred embodiments of the wasp trap, designed to prevent accidental wasp stings when the collection chamber is being replaced, for example during re-baiting. If the insects therein are then to be disposed of safely, it is desirable to be able to seal or close the container without permitting any insects to escape.

In a first embodiment, the safety plug or closure apparatus may advantageously comprise a tubular inlet extending from the vapour chamber funnel opening and a diaphragm, or septum, spanning the opening at the collection chamber entrance. At a central portion of the diaphragm three or more closure elements extend inwardly. The tubular inlet is insertable through the central portion of the diaphragm, resiliently deflecting the closure elements to open the opening into the collection chamber. Access from the vapour chamber to the collection chamber is then provided along the interior of the inlet. The inlet is removable from the diaphragm to allow the resilient closure elements to return to their undeflected position to close the opening.

Advantageously, the tubular inlet or inlet passage may be cylindrical or frusto-conical. In the latter case, the inlet may provide an entrance funnel. Advantageously, for example, the inlet may provide or comprise a part of the restriction between the vapour chamber and the collection chamber.

The closure apparatus advantageously comprises four or more closure elements and particularly preferably five closure elements. Advantageously, the closure elements are integral with the diaphragm, which is formed of a resiliently-deformable material, and bounded by slits, or cuts, radiating from a central point. Advantageously, each slit, or cut, terminates at a stress-relieving hole. This may prevent any tendency for the slits to extend or tear under the stress induced by passing the inlet between the closure elements.

In a preferred embodiment of the closure apparatus, the diaphragm is domed or otherwise asymmetrically formed (for example conically-formed). In this embodiment, the closure elements in their undeflected position are not coplanar. This has the effect that a lower force is required to separate the closure elements from one side of the diaphragm (the concave side) than from the other (the convex side). This embodiment may advantageously help to prevent egress or release of the contents from the collection chamber when the closure apparatus is in its closed condition. This embodiment is particularly advantageous when the collection chamber may contain live wasps.

A further advantage of this embodiment of the closure apparatus is that it decreases the angle of deflection of the closure elements when the inlet is inserted through the diaphragm, by comparison with a flat diaphragm in which the closure elements are coplanar in their undeflected position. The reduction in opening force and closure element deflection both reduce the stresses and strains applied to the closure elements and advantageously ease the demands on the material of the closure elements.

Advantageously, the diaphragm and the closure elements may be moulded from a resilient material, such as a rubber. Preferably, they may also be formed as a single component.

In a further aspect of the closure element, at its periphery the diaphragm may comprise a grommet, or an edge region of enlarged cross-section.

Advantageously, these may be moulded or formed from the same material. The grommet may be shaped for fitting into the entrance of the collection chamber.

Advantageously, an annular insert may also be provided, which fits within the grommet on one side of the diaphragm. The annular insert may advantageously retain the grommet within the entrance.

An inner surface of the annular insert may advantageously be shaped so as to receive or guide the inlet of the closure apparatus. Thus, to open the opening, the inlet may be inserted through the annular insert and thus guided to the central portion of the diaphragm. Further, the annular insert may locate the inlet in position while the opening is open.

The action of the insert in retaining the grommet within the entrance and guiding the inlet is important because, as the inlet is inserted through the diaphragm or is withdrawn, forces are applied to the diaphragm which may tend to dislodge it from the entrance. The insert advantageously helps to prevent this.

In summary, therefore, in use of this type of trap insects are attracted into the vapour chamber and eventually fall into the collection chamber. When trapping stinging insects, such as wasps, it is important that the collection chamber can be sealed without wasps escaping. The closure apparatus is used to couple the vapour chamber to the collection chamber; the diaphragm spanning an entrance to the collection chamber and the inlet protruding at a lower end of the vapour chamber. To set up the trap, the vapour chamber is mounted on the collection chamber by forcing the inlet between the closure elements of the diaphragm. After insects have been collected in the collection chamber, the vapour chamber can be removed, withdrawing the inlet of the closure apparatus and allowing the closure elements to close the opening from the collection chamber. The automatic closure of the collection chamber entrance may advantageously prevent the escape of insects from the collection chamber.

In a second closure embodiment, the collection chamber safety plug or closure has a self-closing hinged flap which closes automatically as the vapour chamber is removed. The safety plug of the second embodiment is preferably manufactured from black opaque PET. Preferably, the depth of the safety plug is lower than an upper shoulder of the collection chamber, in order to retain free flying wasps within the collection chamber by encouraging them to continue to fly towards the light which is maximised in the transparent shoulder of the collection chamber.

5. Bait, Collection, or Killing Chamber

In a preferred embodiment, as described below, the collection chamber contains a liquid bait. Vapour from the liquid passes into the vapour chamber to attract insects such as wasps. When wasps fall from the vapour chamber into the collection chamber they may fall into the liquid bait and be killed, by drowning. Thus, while the collection chamber may be referred to as a bait chamber or killing chamber, its primary function is to collect insects entering the collection chamber from the vapour chamber. The terms collection chamber, bait chamber and killing chamber may therefore be taken, with reference to various embodiments of the invention, to refer to the same general component of the trap.

Bait could mean any attractant or lure and may advantageously, but not exclusively, be located in the collection chamber. Alternatively, bait could be located in a further chamber, also connected to the vapour chamber, or within the vapour chamber itself.

In the insect trap it may be advantageous to use a liquid bait. The closure apparatus may then advantageously provide a sealing effect to prevent bait spillage when the closure elements are in their undeflected position.

5.1 The collection chamber is preferably manufactured from a clear plastics material, such as PET. This allows visual inspection of the amount of wasps which have been captured and killed.

5.2 The clear design allows examination of the safety closure or flap (if fitted) to ensure that it is unhindered and capable of closing during rebaiting.

5.3 The clear design of the collection chamber advantageously encourages wasps to continue to fly towards the light and away from the opening in the restriction.

5.4 The collection chamber preferably has a line etched onto the wall of the chamber as a guide beyond which it is not recommended to capture more wasps. This is a safety feature designed to prevent the closure apparatus from becoming hindered by the sheer volume of caught wasps. This may be a problem particularly if the closure apparatus utilises a self-closing flap.

5.5 The collection chamber is preferably square or triangular in horizontal cross section and significantly wider than the vapour chamber. This is so that once affixed to the vapour chamber, the collection chamber also acts as a counter weight and stable base. This may advantageously allow the trap to be used either free standing or hanging from a support.

6. Collection Chamber Lid 6.1 To provide a more permanent closure, a lid, such as a screw-on lid, may be applied to cover the closure apparatus, or the portion of the closure apparatus (such as a diaphragm or septum) spanning the collection chamber opening. This may also advantageously provide a substantially liquid-tight seal.

The lid to the collection chamber may advantageously be designed to screw onto an upper end of the vapour chamber to provide a fixture for hanging the wasp trap. The lid would then preferably be transparent.

6.2 The collection chamber lid is preferably designed to be screwed onto the vapour chamber for safe-keeping whilst the trap is in use. The collection chamber may then be re-lidded when it is ready for replacement and disposal.

7. Mesh Baffle 7.1 The mesh baffle is an optional feature of the wasp trap which when fitted to the restriction, will keep trapped wasps or other insects in the vapour chamber and prevent them from entering the collection chamber and potentially being killed in the bait (if present in the collection chamber). This allows the trap to be used as a humane means of capturing insects during field studies where there is no intention or need to kill them.

DESCRIPTION OF SPECIFIC EMBODIMENTS AND BEST MODE OF THE INVENTION

Specific embodiments of the invention will now be described by way of example, with reference to the drawings in which:

FIG. 1 is a side view of an insect trap according to a first embodiment of the invention;

FIG. 2 is a cross-section of the insect trap of FIG. 1;

FIG. 3 is an isometric view of the bait chamber of the insect trap of the first embodiment:

FIG. 4 is a plan view of the bait chamber of FIG. 3;

FIG. 5 is a side view of the bait chamber of FIG. 3;

FIG. 6 is a cross-section of the bait chamber of FIG. 3;

FIG. 7 is an isometric view of the vapour chamber of the trap of FIG. 1;

FIG. 8 is a longitudinal section of the vapour is chamber of FIG. 7;

FIG. 9 is a side view of the vapour chamber of FIG. 7;

FIG. 14 is an isometric view of the closure diaphragm of the trap of FIG. 1;

FIG. 15 is a side view of the diaphragm of FIG. 14;

FIG. 16 is a longitudinal section of the diaphragm of FIG. 14;

FIG. 17 is a view from beneath the diaphragm of FIG. 14;

FIG. 18 is a sectional view of the diaphragm of FIG. 14, on C-C as shown in FIG. 17;

FIG. 25 is an isometric view of the screw-on lid of the trap of FIG. 1;

FIG. 26 is a plan view of the lid of FIG. 25;

FIG. 27 is a longitudinal section of the lid of FIG. 25;

FIG. 28 is a side view of the lid of FIG. 25;

FIG. 29 is a partial section of the lid of FIG. 25 on B-B as shown in FIG. 26;

Figure 12:
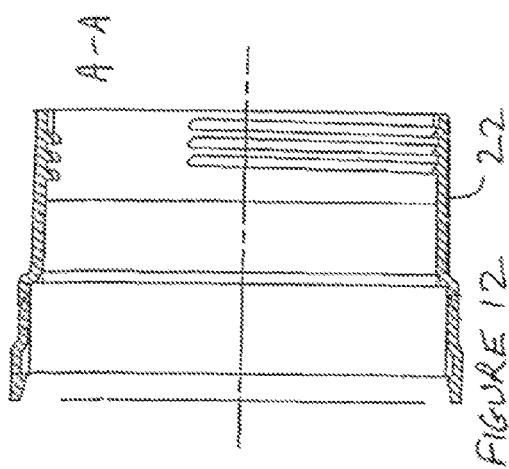
FIG. 12 is a longitudinal section of the coupling ring of FIG. 10.
Figure 11:
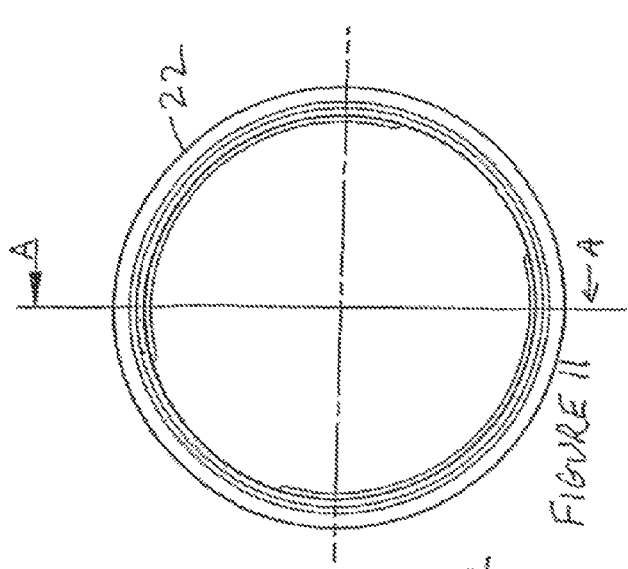
FIG. 11 is a plan view of the coupling ring of FIG. 10.
Figure 13:
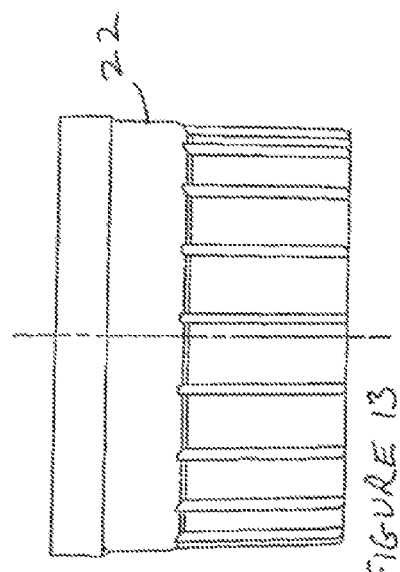
FIG. 13 is a side view of the coupling ring of FIG. 10.
Figure 10:
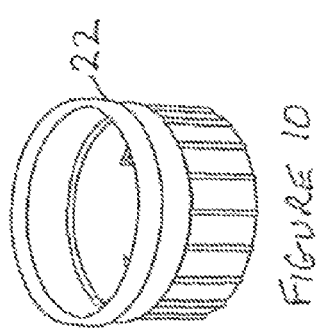
FIG. 10 is an isometric view of a coupling ring of the trap of FIG. 1.

A first embodiment of the invention will be illustrated with reference to a trap for wasps, as illustrated in FIG. 1, and shown in section in FIG. 2. The trap comprises a vapour chamber 2 coupled by means of a closure apparatus 4 to a collection chamber 6. The collection chamber contains liquid bait in this embodiment, and so forms a bait chamber, or killing chamber, 6. The bait chamber is illustrated in more detail in FIGS. 3 to 6 and the vapour chamber in FIGS. 7 to 9. The bait chamber has an opening 8 in its upper surface, surrounded by a substantially cylindrical neck 10. The outer surface of the neck is threaded.

A moulded rubber diaphragm, or septum, 12 fits within the neck as described in more detail below. An annular insert 14 fits within the diaphragm.

The vapour chamber is substantially cylindrical in shape and at its lower end (when oriented for use) terminates in a narrowing frusto-conical funnel 16 leading to a tubular inlet 18. To assemble the trap for use, the tubular inlet is inserted through the annular insert 14 and then through a central portion of the diaphragm comprising five inwardly-extending closure elements 20. When fully inserted, the tubular inlet extends into the bait chamber and the funnel 16 is supported on inner surfaces of the annular insert and the diaphragm. A substantially cylindrical collar 22 encircles the lower end of the vapour chamber, being retained by engagement with a circumferential lip 24 protruding from the outer wall of the cylindrical portion of the vapour chamber. A lower end of the collar is internally threaded for engagement with the externally-threaded neck of the bait chamber. Screwing the collar onto the neck securely retains the vapour chamber in position on the bait chamber. The structure of the collar is shown in more detail in FIGS. 10 to 13.

In use of the trap, bait is placed in the bait chamber and the vapour chamber attached to the top of the bait chamber. Vapour from the bait enters the vapour chamber and wasps attracted by the vapour enter the vapour chamber through entrances 26 in its side wall.

The trapped wasps fly within the vapour chamber, emitting distress pheromones which in turn attract further wasps, until they tire and fall into the funnel at the base of the vapour chamber. The wasps then fall into the bait chamber from which they are unlikely to escape. This is because wasps tend to fly towards light and at least the upper shoulder 28 of the bait is chamber is fabricated from a transparent material, attracting the wasps to fly into the corners of the bait chamber and away from the inlet 18 through which they could return to the vapour chamber.

After the trap has operated for a period of time, the bait chamber typically contains a very large number of wasps and so it is important to be able to seal the bait chamber reliably for disposal. This is achieved by unscrewing the collar 22 and removing the vapour chamber from the bait chamber, whereupon the closure elements 20 resiliently move together to close the bait chamber entrance. This procedure and the structure of the closure apparatus at the bait chamber entrance will now be described in more detail.

The Closure Apparatus

The closure apparatus comprises the diaphragm 12, which is moulded from a resilient material such as a rubber, and the inlet 18 extending from the vapour chamber. The diaphragm is illustrated in more detail in FIGS. 14 to 20.

The diaphragm comprises a substantially annular grommet 30 and a domed, or conical, section 32 spanning the interior of the annular grommet.

The neck 10 of the bait chamber primarily comprises a cylindrical wall 50, which carries on its outer surface the thread for engagement with the collar 22. The cylindrical wall is joined to the container portion of the bait chamber at a narrower, waisted portion 52. At its outer end, distant from the container portion of the bait chamber, the neck terminates at a flange 54 which extends inwardly from the cylindrical wall.

The grommet portion of the diaphragm is moulded to be a press fit within the neck 10. At its lower edge, the grommet comprises castellations 34 which bear on an upper edge of the waisted portion 52 of the neck 10. The castellated structure is used to reduce the volume of rubber required to mould the diaphragm. Above the castellations, the grommet is shaped with a substantially cylindrical external wall, to fit against the internal wall of the cylindrical portion 50 of the neck. Two circumferential ribs 38 extend outwardly from the cylindrical wall of the grommet and bear against the internal wall of the cylindrical portion to improve sealing. At its upper end, the cylindrical wall terminates at an inwardly-extending circumferential groove 40, which matches the inwardly-extending flange 54 of the neck 10. Above the groove, the grommet terminates at an annular ridge 42, which protrudes above the neck of the bait chamber when the grommet is in position within the neck.

The domed portion 32 of the diaphragm extends (in use) downwardly from the castellations of the grommet and, when the diaphragm is in place in the neck of the bait chamber, into the bait chamber itself.

The annular insert 14, for insertion within the grommet, is illustrated in more detail in FIGS. 21 to 24. The insert is moulded from a substantially rigid plastics material. From the upper edge of the insert a flange 72 extends outwardly, being shaped to fit into a circumferential groove 44 defined in the inner-wall of the grommet. The outer surface of the insert extends downwardly from the flange 72. Adjacent the flange this surface is substantially cylindrical, to match the internal surface of the grommet, but at its lower end 74, the insert tapers progressively to match the internal profile of the domed portion of diaphragm. The internal profile of the insert is substantially frusto-conical, tapering inwardly from the flange 72 at its upper edge. The inner surface of the insert is defined by a plurality of fins 76; these reduce the volume of material required to mould the insert. The frusto-conical profile is shaped to match the exterior of the funnel 16 at the base of the vapour chamber. The frusto-conical interior of the insert terminates at its narrow end at an opening which is large enough to guide the tubular inlet 18 at the end of the vapour chamber into contact with the central portion of the diaphragm beneath, where the closure elements are located.

In summary, therefore, the diaphragm is fitted into the neck of the bait chamber as follows. As the diaphragm is pressed into the neck, the castellations 34 engage the waisted portion 52 at the base of the neck 10 to prevent the diaphragm from falling into the bait chamber. When the diaphragm is seated in the neck, the flange 54 extending inwardly at the upper edge of the neck seats in the external groove 40 of the diaphragm. The insert is then press fitted within the diaphragm, until the external flange 72 at the upper edge of the insert enters the internal groove 44 within the diaphragm. The upper edge of the grommet is chamfered to guide the insert into this position. When the insert is in position, it acts to prevent the rubber grommet from deforming and coming free from the flange 54 surrounding the neck of the bait chamber. In addition, the insert is sized such that, when press fitted within the grommet, it urges the grommet against the internal surface of the neck. This helps to ensure a liquid-tight seal, particular between the ribs 38 and the cylindrical surface of the neck.

The Closure Elements

At the central portion of the diaphragm, five substantially triangular closure elements 80 extend inwards, as shown in FIG. 17. These are divided by slits 82 extending outwardly from a common point at the centre of the diaphragm. Each slit terminates at a circular, stress-relieving hole 84. The closure elements are moulded from the same resilient material as the remainder of the diaphragm and, when the inlet 18 is inserted through the central portion of the diaphragm, resiliently deflect outwards, as shown in FIG. 2. As the closure elements deflect, the stress-relieving holes 84 prevent tearing of the diaphragm.

Figure 20:
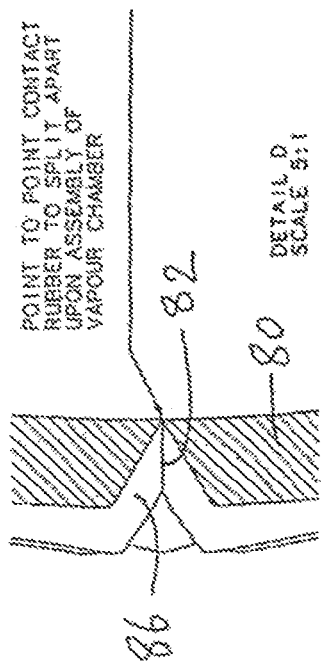
FIG. 20 is a section of a detail D of the diaphragm of FIG. 14, with reference to FIG. 18.
Figure 19:
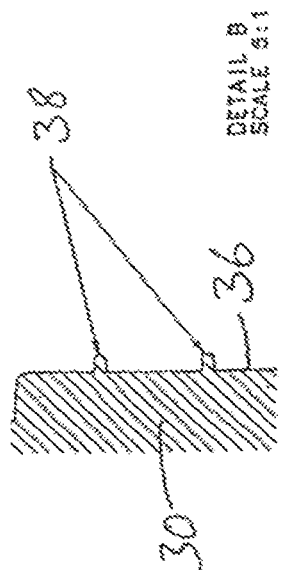
FIG. 19 is a section of a detail B of the diaphragm of FIG. 14, with reference to FIG. 16.
Figure 23:
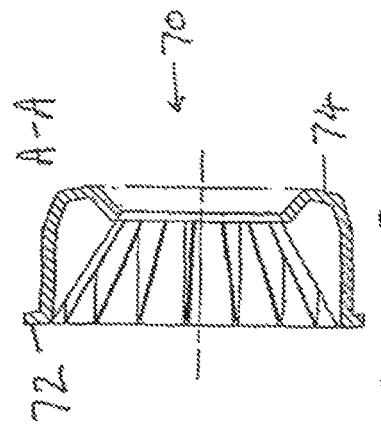
FIG. 23 is a longitudinal section of the insert of FIG. 21.
Figure 22:
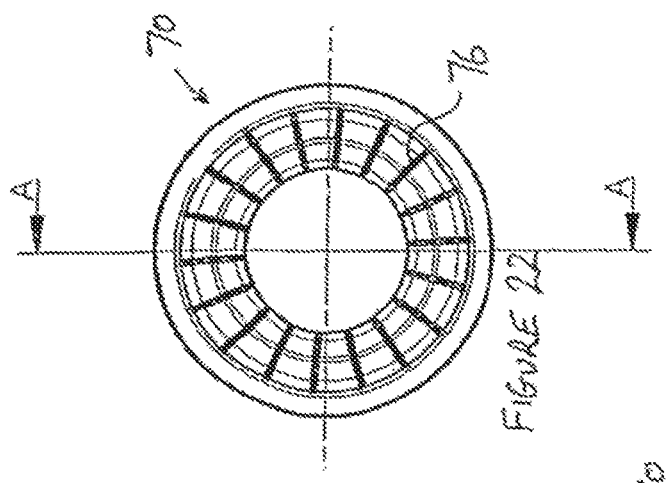
FIG. 22 is a plan view of the insert of FIG. 21.
Figure 24:
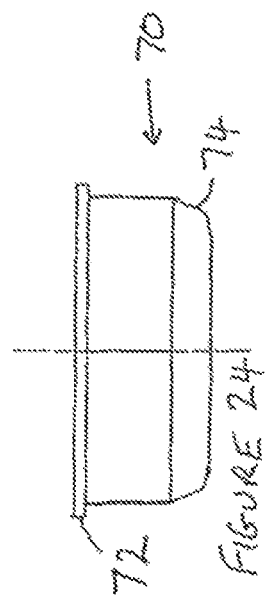
FIG. 24 is a side view of the insert of FIG. 21.
Figure 21:
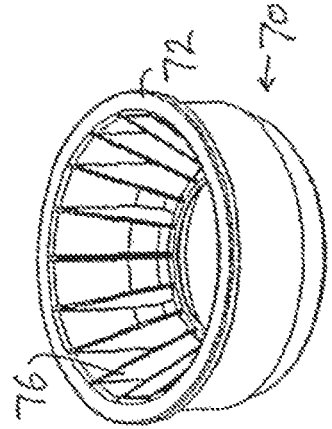
FIG. 21 is an isometric view of the annular insert of the trap of FIG. 1.
Figure 30:
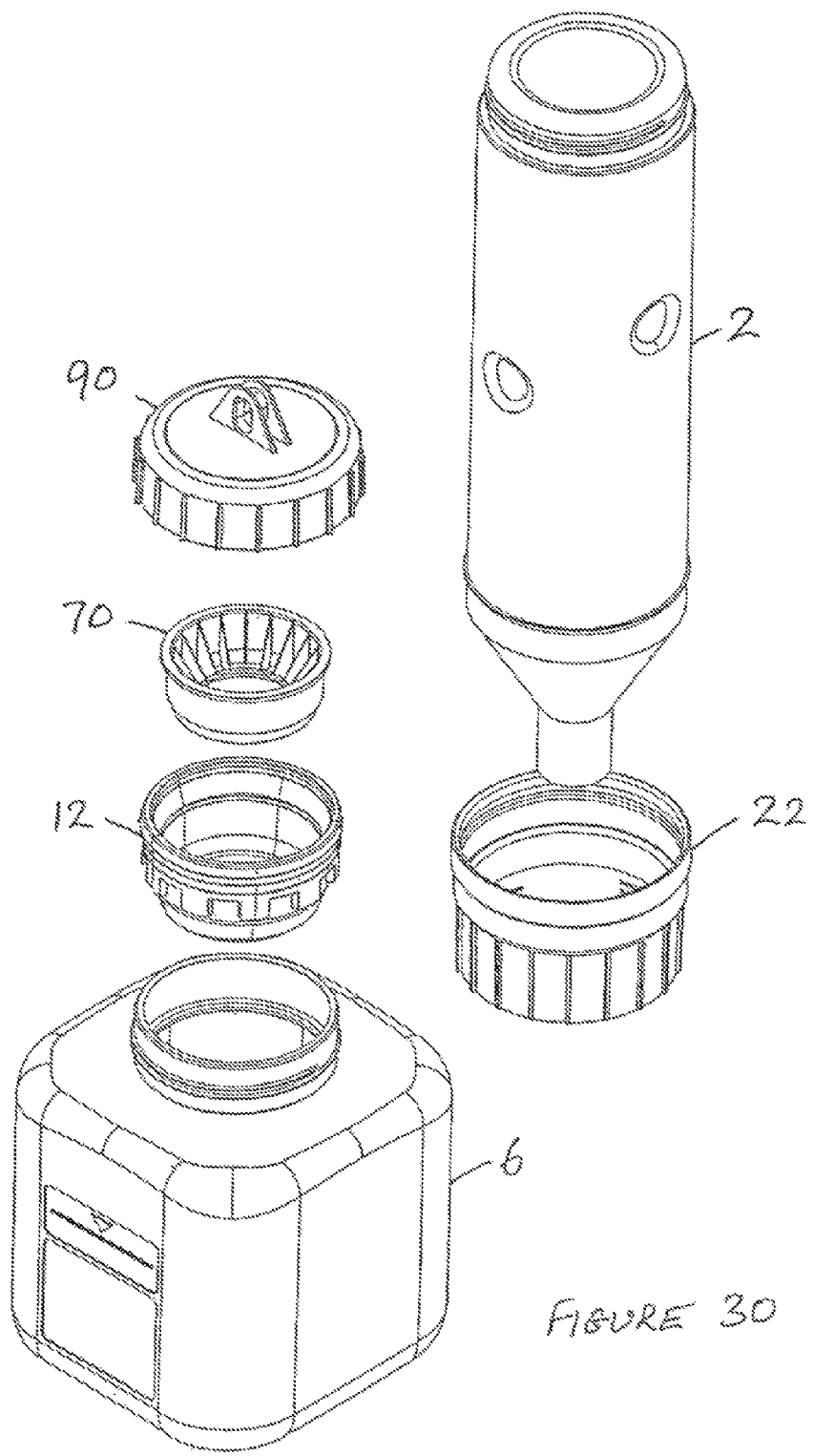
FIG. 30 is an exploded view of the insect trap of FIG. 1.

When the diaphragm is initially moulded, the slits 82 are defined by chamfered grooves 86 but these do not penetrate entirely through the diaphragm and so the slits themselves are not formed. The slits are formed by tearing of the rubber at the base of each groove 86 as the inlet is first inserted through the diaphragm. Details of this construction are shown in FIG. 20. This enables the diaphragm to provide a completely liquid-tight seal before the first assembly of the trap. For this purpose, the stress-relieving holes 84 may not comprise holes through the entire thickness of the diaphragm, but regions in which the thickness of the diaphragm is substantially reduced. These aspects of the diaphragm construction enable bait to be provided, sealed within the bait chamber, and vapour only released when the trap is assembled and ready for use.

The domed or conical shape of the portion of the diaphragm comprising the closure elements provides a number of advantages. First, it reduces the angle through which the closure elements are deflected as the inlet is forced between them. This advantageously reduces the loading on the rubber material of the closure elements. Further, the reduced deflection of the closure elements helps the closure elements to lie close to or in contact with the external surface of the tubular inlet when inserted. This advantageously reduces the possibility that wasps may find their way out of the bait chamber between the closure elements and the inlet.

As the vapour chamber and the bait chamber are assembled and the inlet is inserted through the diaphragm, a force is applied to the diaphragm tending to push it into the bait chamber. Contact between the castellations of the grommets and the waisted portion of the neck prevent this. In this area of the diaphragm, the insert also prevents the grommet from distorting and falling into the bait chamber.

When the vapour chamber is removed from the bait chamber, the bait chamber may be filled with wasps. As the inlet is withdrawn from the closure elements, a force is applied to the diaphragm tending to pull it out of the neck of the bait chamber, which is undesirable as it would release the wasps. This is prevented by the interaction of the grommet with the flange 54 at the upper end of the neck. This is assisted by the action of the insert. As the inlet is withdrawn, the closure elements are pulled upwards towards and against the rigid insert. This force is transferred through the insert to the grommet and thus to the flange at the upper end of the neck of the bait chamber preventing removal or distortion of the grommet portion of the diaphragm.

As the inlet is withdrawn, there may be a tendency for one or more of the closure elements to adhere to the inlet. The profile of the lower edge of the insert is rounded, and the inner opening of the insert is sufficiently large, to prevent any closure elements adhering to the inlet from jamming within the insert (between the inlet and the insert) as the inlet is withdrawn. The opening in the insert is, however, sufficiently small to prevent any wasps escaping as the inlet is withdrawn as a result of being caught between a closure element and the inlet.

When the vapour chamber has been removed from the bait chamber, the closure elements resiliently recover into contact with each other, closing the bait chamber and preventing the escape of any trapped wasps. A further advantage of the domed, or conical, shape of the central portion of the diaphragm is that a greater force is required to press the closure elements open from within the bait chamber than from outside the bait chamber. Thus, even if the bait chamber is accidentally inverted after the diaphragm is closed, no insects should escape.

Finally, a screw-on lid 90 is provided for the bait chamber. This is shown in FIGS. 25 to 29. After the vapour chamber has been removed, the lid is simply screwed onto the bait chamber to provide a permanent seal. The annular ridge 42 at the upper edge of the grommet extends beyond the flange 54 at the upper edge of the neck in order to provide a rubber seal against which the lid can close, to provide a liquid-tight seal.

Figure 31:
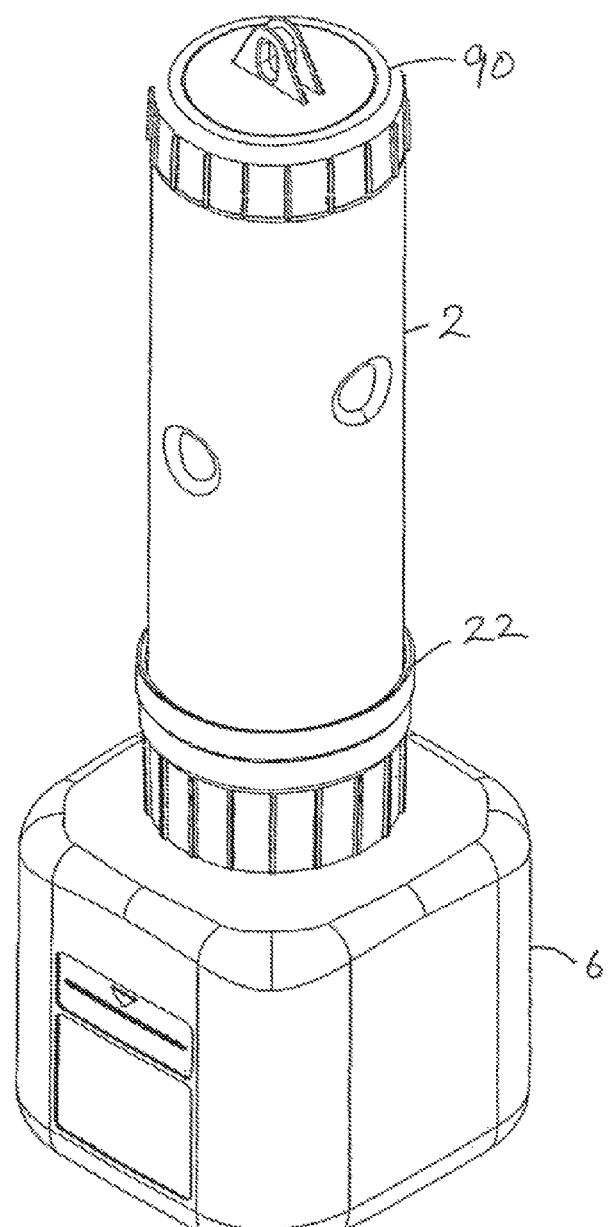
FIG. 31 is an isometric view of the insect trap of FIG. 1.
Figure 32:
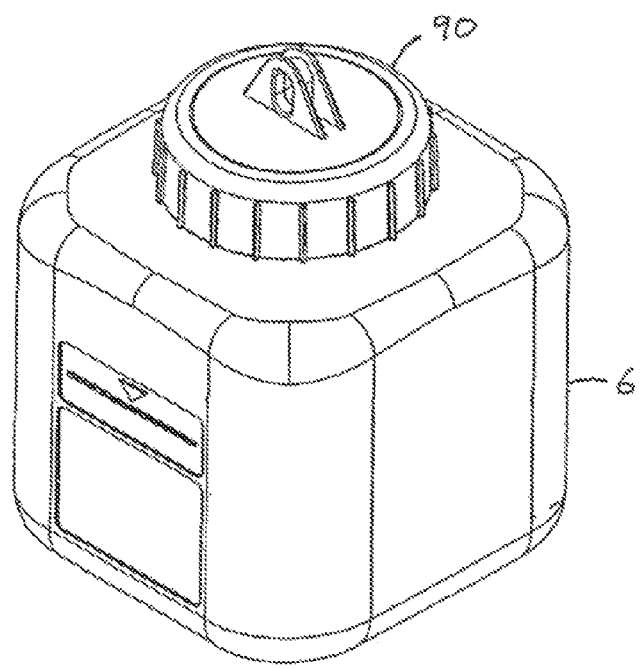
FIG. 32 is an isometric view of the screw-on lid of FIG. 25 attached to the bait chamber of FIG. 3.

When the vapour chamber is coupled to the bait chamber, the lid 90 can conveniently be stored at an upper end of the vapour chamber as shown in FIGS. 1, 2 and 31. A hook or eye 92 is moulded on an upper surface of the lid, from which the trap can be suspended if desired when the lid is in this position.

FIGS. 33 to 36 illustrate a wasp trap according to a second embodiment, comprising a vapour chamber 102 coupled at a screw thread 104 to an opening in the top of a collection chamber 106. As in the first embodiment, the collection chamber is suited to contain liquid bait and so may be termed a bait or killing chamber. The vapour chamber is positioned vertically above the bait chamber and the assembled trap can stand on the flat base 108 of the bait chamber. The bait chamber can be unscrewed to remove it from the vapour chamber and can then be sealed using a threaded lid 110. When the bait chamber is coupled to the vapour chamber the lid can be screwed onto a thread at the upper end of the vapour chamber for safe keeping. The lid is also provided with a protruding tab, or eye, 112 to which a string can be attached, so that the trap may be suspended during use, for example from the branch of a tree.

The vapour chamber 102, the bait chamber 106 and the lid 110 are all advantageously moulded from a transparent plastics material, such as PET.

Figure 34:
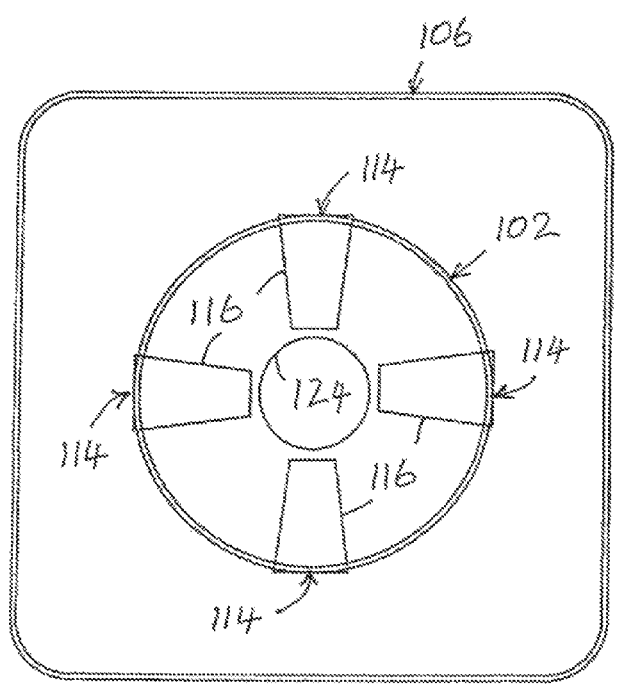
FIG. 34 is a partial plan view of the wasp trap of FIG. 33.

The vapour chamber is circular in cross section as shown in FIG. 34, and four insect entrances 114 are formed in its vertical side wall. Each entrance is surrounded by a frusto-conical flange 116 which extends into the vapour chamber, ending at a narrow opening 118. The entrances are substantially horizontally oriented so that wasps can easily crawl or fly into the vapour chamber. The length of each flange is predetermined so that wasps flying within the vapour chamber and rebounding from its walls do not rebound beyond the flanges.

In use, a bait is placed in the bait chamber to release an aroma, which passes into the vapour chamber and out of the insect entrances, to lure insects into the trap.

The bait is typically liquid and wasps entering the bait chamber are likely to drown in this liquid.

None of the insect entrances are aligned with each other and all four entrances are at different heights. The inventor has found that avoiding alignment of the entrances reduces the number of wasps which escape from the vapour chamber and that vertically spacing the entrances enhances the release of bait aroma from the vapour chamber. In addition, the entrances are circumferentially spaced around the vapour chamber, so that wind from any direction passes through the vapour chamber to distribute bait aroma.

At the lower end of the vapour chamber a restriction 120 comprises a frusto-conical flange, or funnel, 122 extending downwardly from the wall of the vapour chamber to a narrower circular opening 124, from which a cylindrical tube 126 extends into the bait chamber. The restriction is opaque, either being coloured or moulded from an opaque plastics material.

Wasps tend to fly towards light, and in the vapour chamber will therefore tend to fly away from the restriction towards upper portions of the vapour chamber. When a wasp is tired, however, it is desirable that it should enter the bait chamber without delay, and so the angle of the sloping portion of the restriction is chosen to be too steep to allow wasps to rest on it.

Figure 33:
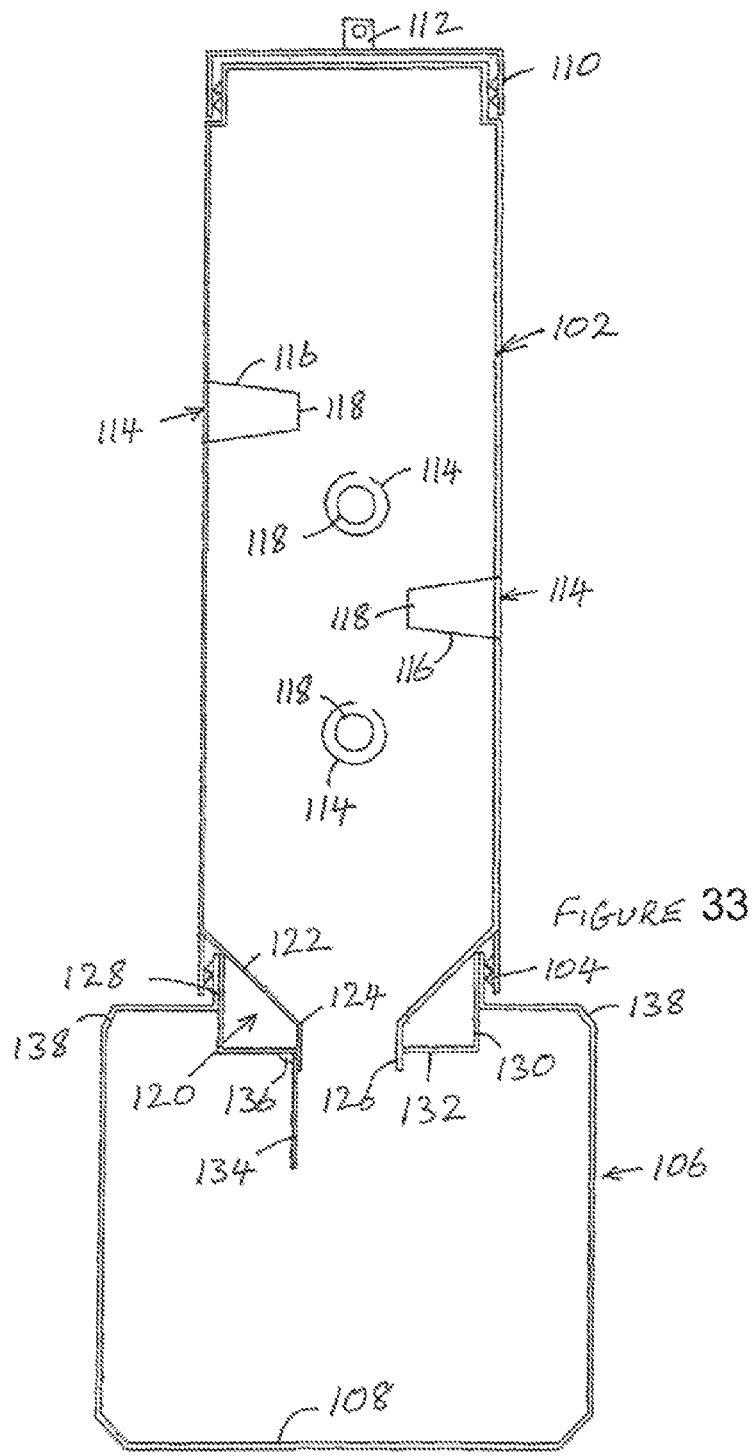
FIG. 33 shows a wasp trap according to a second embodiment of the invention, assembled for use.

The bait chamber has a circular opening surrounded by a cylindrical wall 128, which is externally threaded to engage either the lower end of the vapour chamber or the bait chamber lid. A safety plug 130 is a push fit within the cylindrical wall and includes a flange 132 which extends radially inwards to a central opening, which fits snugly around an outer surface of the cylindrical tube 126 of the restriction when the bait chamber is threaded onto the vapour chamber. The safety plug also comprises a self-closing flap 134 which is biassed by a spring 136 towards a closed position, in which it seals the central opening of the safety plug. As the bait chamber is threaded onto the vapour chamber, an end of the cylindrical tube 126 urges the flap 134 into an open position as shown in FIG. 33. As the bait chamber is unscrewed from the vapour chamber, the cylindrical tube is withdrawn, allowing the flap to seal the opening in the safety plug before the bait chamber is fully unscrewed.

Figure 35:
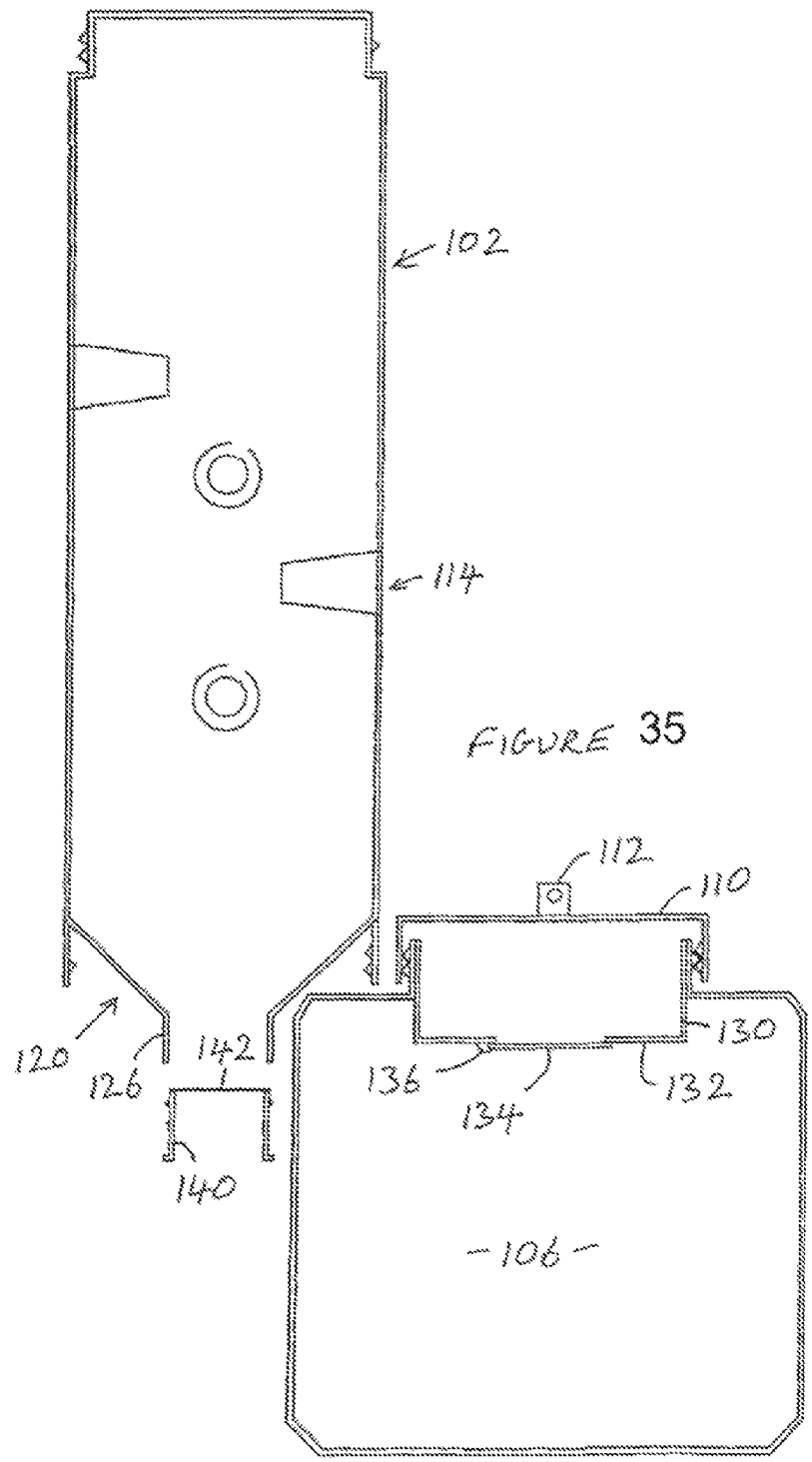
FIG. 35 shows the wasp trap of FIG. 33 after removal of the bait chamber.

FIG. 35 shows the bait chamber removed from the vapour chamber, with the flap closing the opening in the safety plug and the bait chamber lid in place.

The safety plug is moulded from an opaque material. Since wasps within the trap tend to fly towards light, this reduces the tendency for wasps to fly out of the bait chamber back into the vapour chamber. It should be noted that transparent shoulders 138 of the bait chamber extend outside and above the bottom of the safety plug. Wasps flying in the bait chamber tend to fly into these shoulders and away from the opening into the vapour chamber.

In an alternative embodiment, the trap may be used for collecting insects alive. In this case, as illustrated in FIG. 35, a cylindrical insert 140 carrying a mesh baffle 142 can be pressed into the cylindrical extension 126 of the restriction. The insert is shaped so that the cylindrical tube can still open the flap in the safety plug. However, the baffle covers the opening between the vapour chamber and the bait chamber so that bait aroma can still be released by the trap but wasps in the vapour chamber cannot enter the bait chamber. Wasps can then be caught alive in the vapour chamber.

Figure 36:
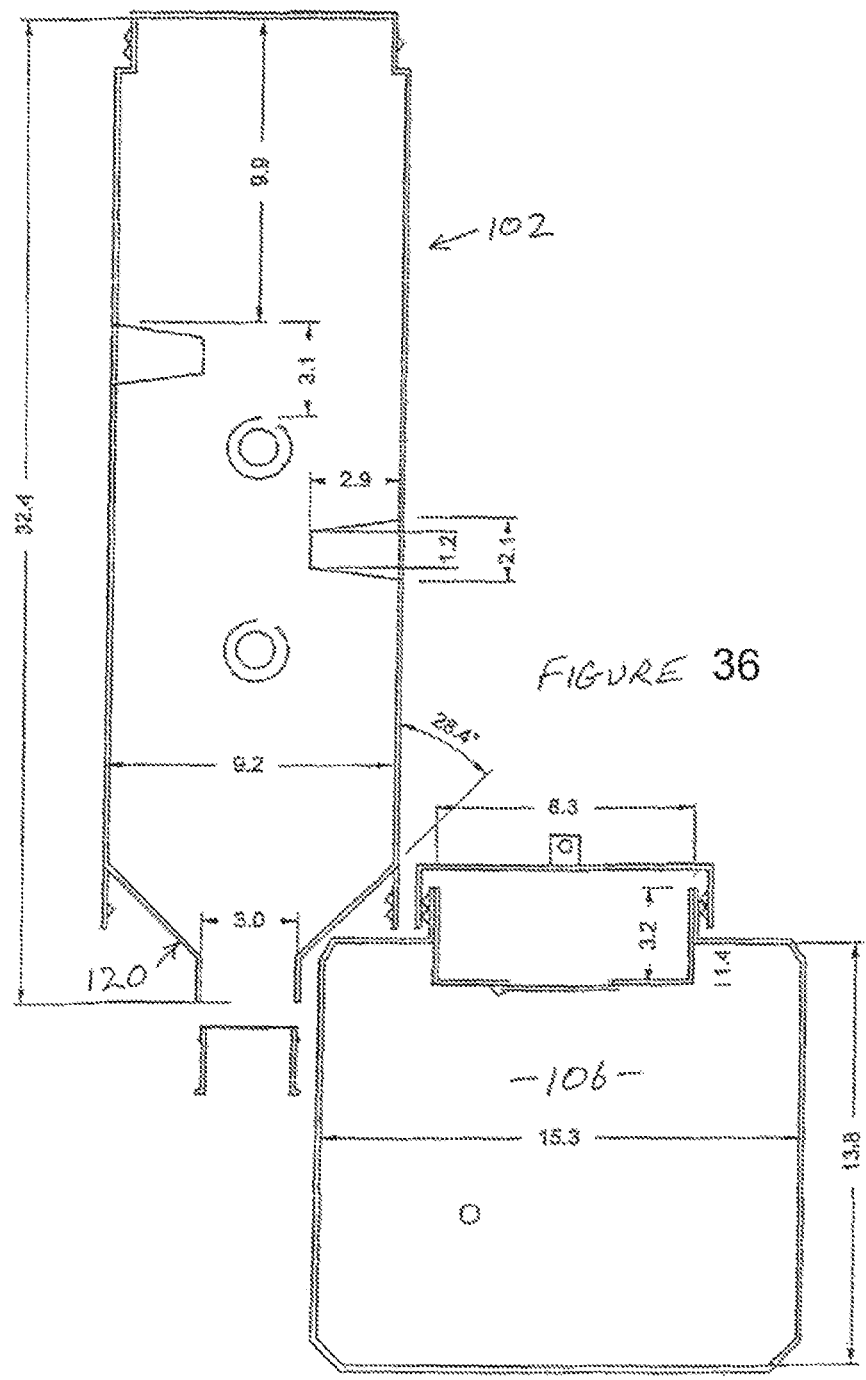
FIG. 36 is a reproduction of FIG. 35 incorporating dimensions, in centimeters, of a particularly preferred embodiment of the invention.

FIG. 36 is a reproduction of FIG. 35 and shows the dimensions of an embodiment of the trap, in centimeters. It also shows the preferred angle for the sloping portion of the restriction 120. Although these dimensions have been found by the inventor to produce a highly effective wasp trap, the skilled person would readily appreciate that the design factors described in this patent application would provide guidance to allow effective traps of different dimensions to be designed, and that such traps therefore fall within the scope of the present invention.

Further Aspects

It has been noted that trapped insects, such as wasps, may tend to fly towards light. After trapping such insects it may be desirable to ensure that all have entered the collection chamber, and that the vapour chamber is empty, before removing the collection chamber from the vapour chamber. To do this it may be advantageous to cover the vapour chamber, but not the collection chamber, with an opaque or substantially opaque cloth or sleeve for a predetermined time. This closes the insect entrances into the vapour chamber to prevent entry of further insects and encourages those in the vapour chamber to enter the collection chamber, which is still lit through its transparent walls. The inventor has found that covering the vapour chamber in this way for about one minute is sufficient to clear the vapour chamber.

It has also been noted above that trapped insects can be sealed in the collection chamber for disposal. The vapour chamber is then available for reuse. In a preferred embodiment, therefore, new collection chambers containing bait can be advantageously supplied for fitting to the reusable vapour chamber. It may be undesirable to reuse collection chambers as it is safer, particularly when trapping stinging. insects, to dispose of the trapped insects sealed within the collection chamber.

A further advantage found by the inventor is that traps embodying the invention may selectively trap certain types of insect. A particularly beneficial example is that a trap set up in an apiary may selectively trap wasps and not bees. It is believed that this may be due to the emission of stress pheromones by trapped wasps attracting only further wasps and not bees.

The invention claimed is:

1. A wasp trap, comprising;
   a vapour chamber detachably couplable to a collection chamber;
   the vapour chamber having a property to form a vapor that is based on an attractant material within the wasp trap, the vapour chamber including:
     a wasp entrance defined in a wall of the vapour chamber;
     a restriction part connected to the vapour chamber, the restriction part being sized to control the movement of wasps from the vapour chamber to the collection chamber when coupled, and the restriction part includes a surface sloping downwardly towards an opening into the collection chamber;
     a tubular inlet extending downwardly from the restriction part; and
   the collection chamber including:
     a housing, an entrance into the housing, and a self-closing part designed to automatically seal the entrance when the collection chamber is detached from the vapour chamber in order to prevent escape of wasps from the collection chamber; the self-closing part includes a resilient diaphragm with three or more inwardly-extending resilient closure elements, and the diaphragm is dome shaped toward an interior of the housing so that the closure elements are more easily deflected to open the diaphragm in an opening direction toward the interior of the housing;
   wherein during coupling of the vapour chamber and the collection chamber, the tubular inlet is insertable through the diaphragm which will deflect the resilient closure elements in the opening direction to open the entrance, and is thereafter removable to allow the resilient closure elements to return to their undeflected position to close the entrance;
   the wall of the vapour chamber is substantially transparent, at least a portion of the collection chamber is transparent, and the restriction part is opaque.

2. The wasp trap of claim 1, wherein the vapour chamber includes a collar rotatably mounted thereon for rotation relative to the wall, the collar including a thread; and the collection chamber includes a thread that is engageable with the thread on the collar whereby the vapour chamber and the collection chamber are detachably couplable.

3. The wasp trap of claim 1, comprising a plurality of wasp entrances defined in the wall, the entrances being vertically spaced from each other on different vertical levels and circumferentially spaced from each other, none of the wasp entrances are aligned with each other, and a vertically uppermost said wasp entrance is spaced from a top end of the vapour chamber by at least a third of the height of the vapour chamber.

4. The wasp trap of claim 1, wherein the collection chamber has a width in a plan view that is greater than a width of the vapour chamber.

5. A wasp trap, comprising:
   a vapour chamber defined by a wall, the chamber having a top end and a bottom end defining a height therebetween, and the wall is substantially transparent;
   a plurality of wasp entrances defined in the wall, the entrances being vertically spaced from each other on different vertical levels and circumferentially spaced from each other, none of the wasp entrances are aligned with each other, and a vertically uppermost said wasp entrance is spaced from the top end of the vapour chamber by at least a third of the height of the vapour chamber;
   a collection chamber detachably couplable to the vapour chamber at a restriction that is sized to delay the passage of wasps from the vapour chamber to the collection chamber, the restriction includes a surface sloping downwardly towards an opening into the collection chamber;
   at least a portion of the collection chamber is transparent, and the restriction part is opaque; and
   a self-closing mechanism for automatically sealing the collection chamber as it is detached from the vapour chamber, in order to prevent trapped wasps escaping from the collection chamber.

6. The wasp trap of claim 5, wherein there is a single said entrance on each vertical level.

7. The wasp trap of claim 5, wherein the vapour chamber includes a collar rotatably mounted thereon for rotation relative to the wall, the collar including a thread; and the collection chamber includes a thread that is engageable with the thread on the collar whereby the vapour chamber and the collection chamber are detachably couplable.

8. The wasp trap of claim 5, wherein the collection chamber has a width in a plan view that is greater than a width of the vapour chamber.

9. A wasp trap system, comprising:
   a vapour chamber having a transparent wall; the chamber having a top end and a bottom end; a plurality of wasp entrances defined in the wall, the entrances being vertically spaced from each other on different vertical levels and circumferentially spaced from each other, and none of the wasp entrances are aligned with each other; a conical restriction part integrally connected to the wall adjacent the bottom end of the vapour chamber; and a tubular inlet extending downwardly from the conical restriction part; and a collection chamber detachably couplable to the vapour chamber, the collection chamber includes a housing, a single entrance into the housing, and a self-closing part designed to automatically seal the entrance.

10. The wasp trap of claim 9, wherein there is a single said entrance on each vertical level.

11. The wasp trap of claim 9, wherein the vapour chamber includes a collar rotatably mounted thereon for rotation relative to the wall, the collar surrounds at least a portion of the conical restriction part, and the collar includes a thread; and the collection chamber includes a thread that is engageable with the thread on the collar whereby the vapour chamber and the collection chamber are detachably couplable.

12. The wasp trap of claim 9, wherein at least a portion of the collection chamber is transparent, and the conical restriction part is opaque.

13. The wasp trap of claim 9, wherein the collection chamber has a width in a plan view that is greater than a width of the vapour chamber.

14. A wasp trap, comprising;

a vapour chamber configured to form a vapour from attractant material placed within the trap;

a wasp entrance defined in a wall of the vapour chamber;

a collection chamber detachably couplable to the vapour chamber at a restriction that is configured to delay the passage of wasps from the vapour chamber into the collection chamber, the restriction includes a surface sloping downwardly towards an opening into the collection chamber;

the wall of the vapour chamber is substantially transparent, at least a portion of the collection chamber is transparent, and the restriction is opaque; and a self-closing mechanism connected to the collection chamber for automatically sealing the collection chamber as it is detached from the vapour chamber in order to prevent trapped wasps escaping from the collection chamber.

15. The wasp trap of claim 14, wherein the vapour chamber includes a collar rotatably mounted thereon for rotation relative to the wall, the collar including a thread; and the collection chamber includes a thread that is engageable with the thread on the collar whereby the vapour chamber and the collection chamber are detachably couplable.

16. The wasp trap of claim 14, comprising a plurality of wasp entrances defined in the wall, the entrances being vertically spaced from each other on different vertical levels and circumferentially spaced from each other, none of the wasp entrances are aligned with each other, and a vertically uppermost said wasp entrance is spaced from a top end of the vapour chamber by at least a third of the height of the vapour chamber.

17. The wasp trap of claim 14, wherein the collection chamber has a width in a plan view that is greater than a width of the vapour chamber.

* * * * *